*US010679071B2*

(12) United States Patent
Anderson et al.

(10) Patent No.: US 10,679,071 B2
(45) Date of Patent: Jun. 9, 2020

(54) CAPTURING DIGITAL IMAGES DURING VEHICLE COLLISIONS

(71) Applicant: INTERNATIONAL BUSINESS MACHINES CORPORATION, Armonk, NY (US)

(72) Inventors: Evelyn R. Anderson, Houston, TX (US); Michael Bender, Rye Brook, NY (US); Rhonda L. Childress, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 87 days.

(21) Appl. No.: 15/867,002

(22) Filed: Jan. 10, 2018

(65) Prior Publication Data
US 2019/0213425 A1     Jul. 11, 2019

(51) Int. Cl.
| | |
|---|---|
| G06K 9/00 | (2006.01) |
| G08G 1/01 | (2006.01) |
| B60R 1/00 | (2006.01) |
| G07C 5/00 | (2006.01) |
| G06T 7/70 | (2017.01) |
| G06Q 40/08 | (2012.01) |

(Continued)

(52) U.S. Cl.
CPC ............ G06K 9/00791 (2013.01); B60R 1/00 (2013.01); G06Q 40/08 (2013.01); G06T 7/70 (2017.01); G07C 5/008 (2013.01); G08G 1/0112 (2013.01); G08G 1/162 (2013.01); H04W 4/44 (2018.02); B60R 2300/105 (2013.01); B60R 2300/50 (2013.01); G06T 2207/30252 (2013.01)

(58) Field of Classification Search
CPC .................. G06K 9/00791; G06T 7/70; G06T 2207/30252; H04W 4/44; B60R 1/00; G06Q 40/08; G07C 5/008; G08G 1/0112; G08G 1/162
See application file for complete search history.

(56) References Cited

U.S. PATENT DOCUMENTS

| 3,853,199 A | 12/1974 | Hayakawa et al. |
|---|---|---|
| 4,381,829 A | 5/1983 | Montaron |

(Continued)

FOREIGN PATENT DOCUMENTS

| CN | 101992729 | 3/2011 |
|---|---|---|
| CN | 104859537 | 8/2015 |

(Continued)

OTHER PUBLICATIONS

Accidents Claims Under the Motor Vehicles Act, 1939, http://www.helplinelaw.com/govt-agencies-and-taxation/ACMV/accidents-claims-under-the-motor-vehcles-act-1939.html, accessed Nov. 27, 2017, 2 pages.

(Continued)

*Primary Examiner* — Michael E Teitelbaum
(74) *Attorney, Agent, or Firm* — Jay Wahlquist; Andrew D. Wright; Roberts Calderon Safran & Cole, P.C.

(57) ABSTRACT

A method for capturing digital images during vehicle collisions includes: detecting, by a computer device, an impact with a vehicle; controlling, by the computer device and based on the detecting, at least one digital camera to capture images of an area around the vehicle; and transmitting, by the computer device, the images to a server that is remotely located relative to the vehicle.

19 Claims, 7 Drawing Sheets

(51) Int. Cl.
*G08G 1/16* (2006.01)
*H04W 4/44* (2018.01)

(56) References Cited

U.S. PATENT DOCUMENTS

| | | | |
|---|---|---|---|
| 4,836,024 | A | 6/1989 | Woehrl et al. |
| 6,021,373 | A | 2/2000 | Zuercher et al. |
| 6,223,125 | B1 | 4/2001 | Hall |
| 6,534,884 | B2 | 3/2003 | Marcus et al. |
| 8,164,508 | B2 | 4/2012 | Merli et al. |
| 9,787,951 | B2 * | 10/2017 | Kannon ............... B60R 1/00 |
| 2015/0341629 | A1 * | 11/2015 | Zeng ................... G06T 7/80 348/187 |
| 2016/0009279 | A1 * | 1/2016 | Jimaa ................. B60W 30/16 701/96 |
| 2016/0040998 | A1 | 2/2016 | Ricci |
| 2016/0275790 | A1 * | 9/2016 | Kang ............. G06K 9/00791 |

FOREIGN PATENT DOCUMENTS

| | | |
|---|---|---|
| EP | 0529558 | 3/1993 |
| GB | 2514151 | 11/2014 |
| WO | 2013100993 | 7/2013 |

OTHER PUBLICATIONS

Hit and Run accidents, http://www.fox5vegas.com/story/27677615/hit-and-run-accidents#ixzz48ir3L35Q, Dec. 20, 2014, 3 pages.

\* cited by examiner

CAPTURING DIGITAL IMAGES DURING VEHICLE COLLISIONS

BACKGROUND

The present invention generally relates to vehicle sensors and, more particularly, to automated systems and methods for capturing digital images during vehicle collisions.

According to the National Highway Traffic Safety Administration, there were 4,548,000 property-damage-only vehicle crashes reported in the United States in a recent year. The economic cost of motor vehicle crashes (police-reported and unreported) can total upwards of $277 billion, with property damage costs of $76.2 billion accounting for 28 percent of the total economic costs. Other countries have reported accident rates of one accident every four minutes, and have implemented social legislation in which a person who causes an vehicle accident has a duty to report this incident immediately to law enforcement as well as leave their information at the scene for the person who owns the property damaged in the accident if that person cannot be located.

SUMMARY

In a first aspect of the invention, there is a method for capturing digital images during vehicle collisions, the method comprising: detecting, by a computer device, an impact with a vehicle; controlling, by the computer device and based on the detecting, at least one digital camera to capture images of an area around the vehicle; and transmitting, by the computer device, the images to a server that is remotely located relative to the vehicle.

In another aspect of the invention, there is a collision recording system comprising: a computer device onboard a vehicle; at least one proximity sensor on the vehicle; at least one impact sensor on the vehicle; and at least one camera on the vehicle. The computer device is configured to: determine that an object is within a proximity of the vehicle based on data from at least one proximity sensor; in response to detecting the object is within a proximity of the vehicle, control at least one camera to capture images of an area around the vehicle; and after determining that the object is within a proximity of the vehicle, perform one of: (i) detect an impact with the vehicle based on data from at least one impact sensor, and continue controlling at least one camera to capture additional images of the area around the vehicle after the detected impact; and (ii) determine that an object is no longer within the proximity of the vehicle without detecting an impact, and delete the captured images.

In another aspect of the invention there is a computer program product for capturing digital images during vehicle collisions, the computer program product comprising a computer readable storage medium having program instructions embodied therewith. The program instructions are executable by a computer device to cause the computer device to: determine that an object is within a proximity of a vehicle based on data from at least one proximity sensor on the vehicle; in response to the detecting the object is within a proximity of the vehicle, control at least one camera on the vehicle to capture images of an area around the vehicle; and after the determining that the object is within a proximity of the vehicle, perform one of: (i) detect an impact with the vehicle based on data from at least one impact sensor on the vehicle, continue controlling the at least one camera to capture additional images of the area around the vehicle for a predefined amount of time after the detected impact, and transmit the images and the additional images to a server that is remote from the vehicle and that is configured to transmit the images and the additional images to at least one designated recipient; and (ii) delete the images in response to determining that an object is no longer within the proximity of the vehicle without detecting an impact.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

The present invention generally relates to vehicle sensors and, more particularly, to automated systems and methods for capturing digital images from vehicle collisions. Aspects of the invention are directed to systems and methods to capture digital images around a vehicle based on detecting an impact with the vehicle. According to aspects of the invention, an Internet of Things (IOT) sensor mounted on a vehicle is triggered to capture digital images upon detecting an impact with the vehicle, e.g., when another object comes into physical contact with the vehicle on which the IOT sensor is mounted. In embodiments, a service captures digital images of an area around a vehicle when the IOT sensor is triggered by an impact, e.g., when another vehicle or object bumps the vehicle in a parking lot. The IOT sensor may be configured to immediately trigger the service upon detecting a breach of a programmed threshold of impact. In embodiments, images are captured from plural angles around the vehicle (e.g., rear, front and side views) to proactively capture events occurring during the collision to provide evidence of responsibility. In this manner, implementations of the invention may be used to proactively capture digital images associated with a vehicle collision to establish accountability for involved parties.

In accordance with an aspect of the invention, there is a vehicle collision recording apparatus including: a proximity sensor mounted in a vehicle; a collision sensor mounted in said vehicle; a digital camera positioned to record digital images of front, rear, and both sides surrounding said vehicle upon impact based upon said collision sensor; and a connection from said digital camera to a cloud storage for sending signals from said proximity sensor and said collision sensor, and said recorded images to said cloud storage and thereupon to a vehicle owner or insurance company upon approval of said vehicle owner.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
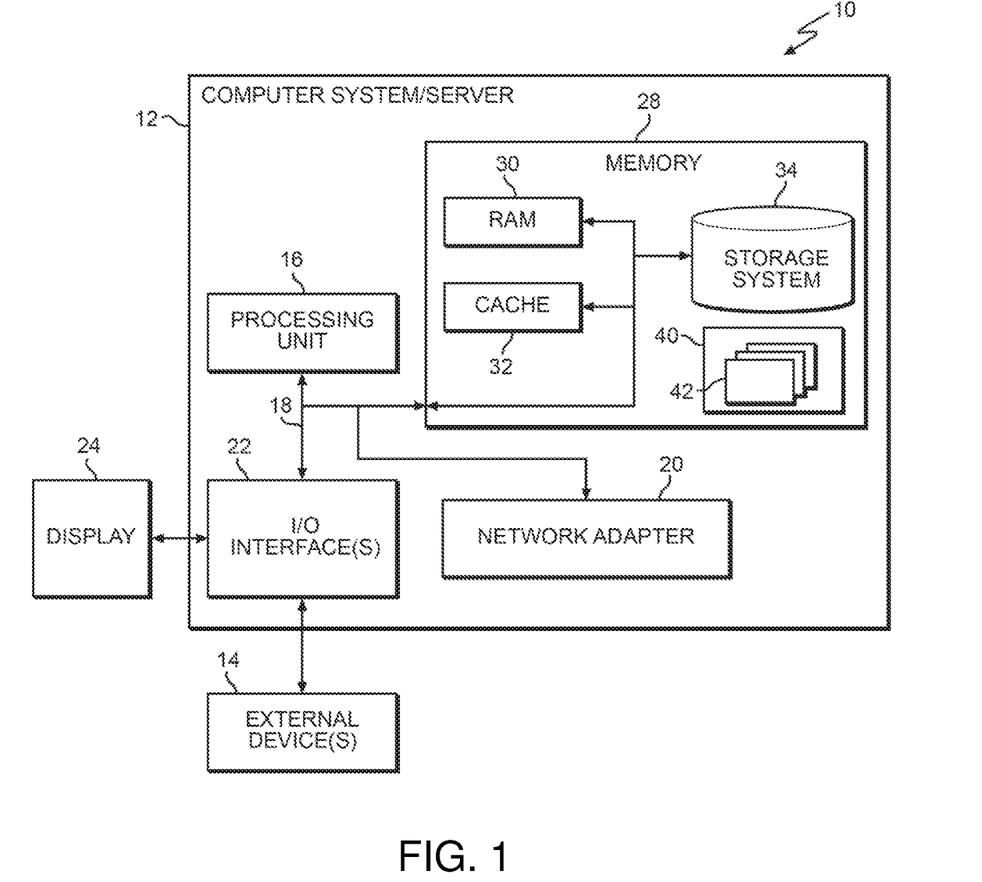
FIG. 1 depicts a computing infrastructure according to an embodiment of the present invention.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2A:
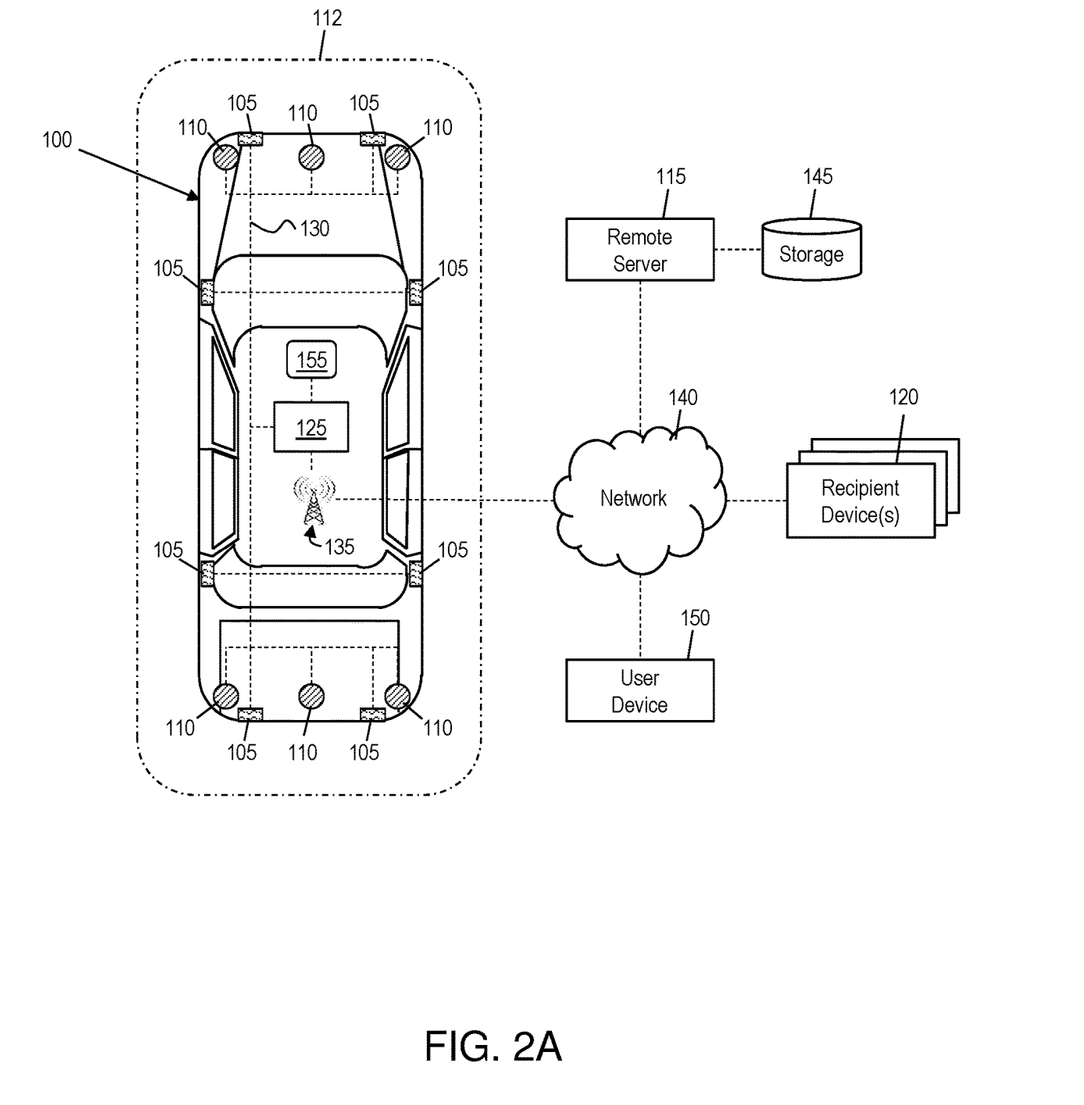
FIG. 2A depicts a block diagram of a system in accordance with aspects of the invention.

FIG. 2A shows a block diagram of an embodiment of a system in accordance with aspects of the invention. In this embodiment, a vehicle 100 is equipped with a collision recording system including impact sensors 105 and digital cameras 110. The collision recording system is configured to use the impact sensors 105 to detect an impact with the vehicle 100 and, in response to the detecting the impact, to use the digital cameras 110 to immediately capture digital imagery of an area 112 around the vehicle 100. In embodiments, the system transmits the digital imagery to a remote server 115 (which may be part of a cloud service, for example) for secure storage. A user registered with the remote server (such as the owner of the vehicle) may designate one or more recipients of the digital imagery, such as the user themselves, an insurance company, etc. The remote server 115 may be configured to automatically transmit the digital imagery to computer devices 120 of the designated recipients.

As depicted in FIG. 2A, the impact sensors 105 and digital cameras 110 may be operatively connected to an onboard computer 125 of the vehicle 100, e.g., by wired or wireless communication represented by the dashed lines 130. The onboard computer 125 may comprise one or more elements of the computer system 12 including, without limitation, a memory that stores one or more programming modules that are executed by a processing unit to perform one or more of the functions described herein. In particular, the onboard computer 125 may be configured (e.g., via one or more program modules) to receive data from the impact sensors 105, to control operation of the digital cameras 110 based on the data from the impact sensors 105, and to transmit data from the digital cameras 110 to the remote server 115. The onboard computer 125 may control the digital cameras 110 by sending control signals to the digital cameras 110.

In embodiments, the onboard computer 125 is configured to control the digital cameras 110 to capture digital images of the area 112 for a predefined amount of time after detecting the collision. Any desired amount of time may be utilized within the scope of the invention. For example, the onboard computer 125 may control the digital cameras 110 to start capturing video immediately (e.g., less than 1 second after the collision is detected) and to continue capturing video for a predefined amount of time, such as 5, 10, 15, 20, 25, or 30 seconds, after the collision is detected. In another example, the onboard computer 125 may control the digital cameras 110 to start capturing still images immediately (e.g., less than 1 second after the collision is detected) and to continue capturing a still image every second for 60 seconds after the collision is detected. The values used in these examples are for illustration and are not intended to limit implementations of the invention.

In addition to data from the digital cameras 110, the onboard computer 125 may be configured to transmit to the remote server 115 other data including but not limited to: an identifier of the vehicle 100 (e.g., vehicle identification number (VIN), license plate number, etc.); time and date of the detected impact; time and date that the digital cameras 110 captured the digital images; and location of the vehicle 100 at the time and date that the digital cameras 110 captured the digital images (e.g., GPS location).

Still referring to FIG. 2A, the impact sensors 105 may comprise any conventional or later developed type of sensor that is configured to detect when an object comes into physical contact with the vehicle 100. Examples include pressure sensors and accelerometers. For example, air pressure sensors may be configured to detect an excess air pressure created by deformation of a closed volume within the vehicle 100, e.g., inside a door panel. Acceleration sensors may be configured to detect acceleration of a portion of the vehicle 100 caused by impact. Other types of sensors may also be used. For example, tire pressure sensors may be used to detect that something has impacted one of the tires of the vehicle 100. In another example, displacement sensors that detect a travel distance of struts connected to axles of the vehicle 100 may be used to detect a collision with the vehicle 100. Any number of impact sensors 105 may be used at any desired locations on the vehicle 100.

The digital cameras 110 may comprise any conventional or later developed type of camera that is configured to capture digital images of an area around the vehicle. Any number of digital cameras 110 may be used at any desired locations on the vehicle 100. In embodiments, the number, type, and location of the digital cameras 110 are selected to capture images from an entire area 112 around the vehicle 100, e.g., including the front, rear, right side, and left side of the vehicle 100. In embodiments, the digital cameras 110 comprise: at least one camera with a field of view at a front of the vehicle; at least one camera with a field of view at a rear of the vehicle; at least one camera with a field of view at a left side of the vehicle; and at least one camera with a field of view at a right side of the vehicle. In embodiments, the area 112 around the vehicle comprises: an area at a front of the vehicle; an area at a rear of the vehicle; an area at a left side of the vehicle; and an area at a right side of the vehicle.

In embodiments, the vehicle 100 includes an antenna 135 operatively connected to the onboard computer 125. The antenna 135 is configured for radio communication between the vehicle 100 other computer devices via a network 140. The antenna 135 may comprise a single antenna or plural antennae, and may be configured for any suitable radio communication protocol including but not limited to at least one of Bluetooth, WiFi, and cellular (e.g., GSM, CDMA, TDMA, EVDO, UMTS, HSPA+, etc.).

With continued reference to FIG. 2A, in embodiments a user (e.g., an owner of the vehicle 100) may provide input via a user device 150 and/or an interface 155 of the onboard computer 125 to define the one or more recipient devices 120. The input may comprise a unique identifier such as a telephone number, email address, MAC address, IP address, etc. The user input is transmitted to the remote server 155 and stored in association with the vehicle 100. The remote server 115 is configured to utilize this user input (e.g., telephone number, email address, MAC address, IP address, etc.) to transmit the data received from the onboard computer 125 to the designated recipients. In embodiments, when the remote server 115 receives data that is generated as a result of a collision with the vehicle 100, the remote server 115 utilizes the identifier of the vehicle 100 received with the data to look up the designated recipients for the vehicle 100 (e.g., defined by the user input), and then transmits the data to the designated recipients. In this manner, the user controls who receives the data that is generated as a result of a collision with the vehicle 100 (e.g., imagery captured by the digital cameras 110, identifier of the vehicle 100, time and date that the digital cameras 110 captured the digital images, and location of the vehicle 100).

In a particular exemplary implementation, the onboard computer 125 is an IOT device and the remote server 115 is an IOT message broker that functions as a publish/subscribe broker service that enables the sending and receiving of messages to and from IOT devices. For example, an IOT message broker may maintain a list of all client sessions and the subscriptions for each session. The IOT message broker, upon receiving a message published from an IOT device, checks for sessions with subscriptions that map to the topic of the published message. The IOT message broker then forwards the published message to all sessions that have a currently connected client. In this implementation, the onboard computer 125 publishes the data that is generated as a result of a collision with the vehicle 100 to the remote server 115, and the remote server 115 forwards the published data to recipient devices 120 that are subscribers of the onboard computer 125. In this manner, the onboard computer 125 comprises an IOT device; the server comprises an IOT broker; and the transmitting comprises the IOT device publishing data to the IOT broker.

The remote server 115 may securely store the data received from the onboard computer 125 in a storage system 145, which may be similar to storage system 34 described with respect to FIG. 1. The storage may be in persistent memory. The storage may be secure, e.g., at least one security measure may be associated with the storage.

Figure 2B:
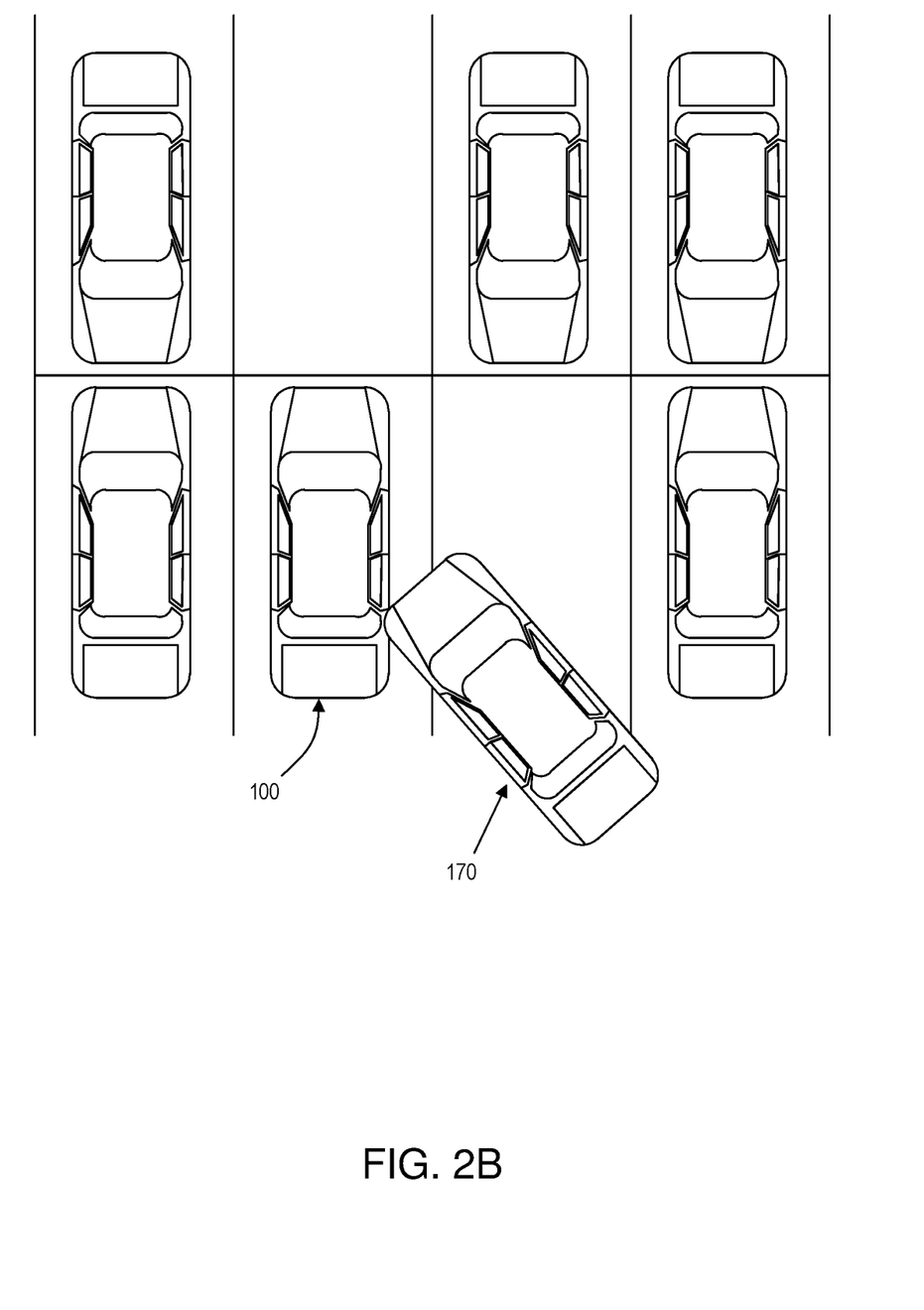
FIG. 2B depicts an exemplary use case that illustrates functionality of the system of FIG. 2A.

FIG. 2B depicts an exemplary use case that illustrates functionality of the system of FIG. 2A. As shown in FIG. 2B, the vehicle 100 is parked in a parking lot. A second vehicle 170 collides with the stationary vehicle 100. In accordance with aspects of the invention, the impact sensors 105 on the vehicle 100 detect the collision by the vehicle 170. Based on the data from the impact sensors 105, the onboard computer 125 of the vehicle 100 controls the digital cameras 110 on the vehicle 100 to begin capturing digital images of the area 112 surrounding the vehicle 100 for a predefined amount of time. The onboard computer 125 transmits the data generated by the collision (e.g., the digital images captured by the digital cameras 110, identifier of the vehicle 100, date and time, and location of the vehicle 100) to the remote server 115, which in turn transmits the data to the recipient devices 120 that have been designated for this vehicle 100. The digital images captured by the digital cameras 110 likely contain sufficient information to identify the vehicle 170, such as an image of the license plate and/or the make, model, and color of the vehicle 170.

Aspects of the invention are not limited to detecting impact by another vehicle, e.g., vehicle 170 as depicted in FIG. 2B. The system in accordance with aspects of the invention may be used to detect impact (and capture imagery) from an object such as a shopping cart that collides with the vehicle 100. The system in accordance with aspects of the invention may be used to detect impact (and capture imagery) that results from vandalism of the vehicle 100.

Figure 3A:
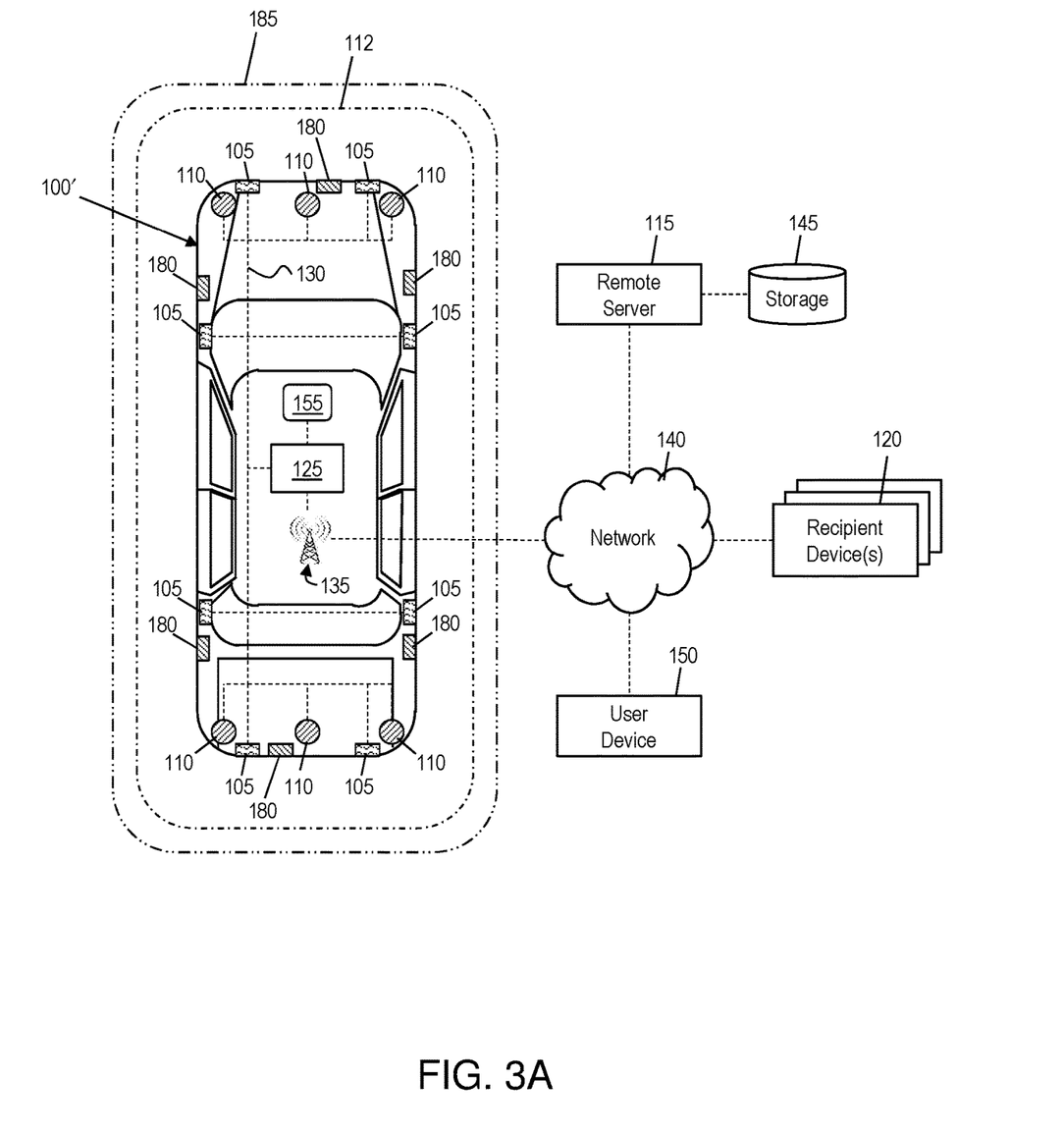
FIG. 3A depicts a block diagram of a system in accordance with aspects of the invention.

FIG. 3A depicts a block diagram of a system in accordance with aspects of the invention. FIG. 3A shows a vehicle 100' that includes a number of the same elements as vehicle 100 of FIG. 2A, which are referred to using the same names and reference numbers. In the embodiment shown in FIG. 3A, the vehicle 100' is equipped with a collision recording system including proximity sensors 180, impact sensors 105, and digital cameras 110. The collision recording system is configured to use the proximity sensors 180 to detect when an object comes within a proximity (e.g., a predefined distance 185) of the vehicle 100'. Based on detecting that an object comes within a predefined distance of the vehicle 100', the system uses the digital cameras 110 to capture digital imagery of an area 112 around the vehicle 100'. The digital cameras 110 may be configured to capture digital images in this manner for a predefined time after the impact (e.g., in the manner described with respect to FIG. 2A) or for as long as the proximity sensors 180 detect that an object is within the predefined distance 185 of the vehicle 100'.

In the event that the proximity sensors 180 detect that an object is no longer within the predefined distance 185 of the vehicle 100', combined with the impact sensors 105 not detecting an impact, then the system deems that no collision has occurred and deletes the digital images captured by the digital cameras 110. On the other hand, if the impact sensors 105 detect an impact while the proximity sensors 180 detect that an object is within the predefined distance 185 of the vehicle 100', then the system deems that a collision has occurred and continues to capture digital images for a predefined amount of time, and then transmits the digital images to the remote server 115 (which may be part of a cloud service, for example) for secure storage. A user registered with the remote server 115 (such as the owner of the vehicle) may designate one or more recipients of the digital imagery, for example the user themselves, an insurance company, etc. The remote server 115 may be configured to automatically transmit the digital imagery to recipient devices 120 of the designated recipients. The system may be advantageously configured as an IOT system, similar to that described with respect to FIG. 2A, in which the onboard computer 125 is an IOT device, the remote server 115 is an IOT publisher, and the recipient devices are subscribers.

The proximity sensors 180 may comprise any conventional or later developed type of sensor that is configured to detect when an object comes within a predefined distance 185 of the vehicle 100'. Examples include photoelectric sensors, ultrasonic sensors, and radar sensors. Any number of proximity sensors 180 may be used at any desired locations on the vehicle 100'. The predefined distance 185 may be defined by the detection range of the proximity sensors 180, and may comprise, for example, a perimeter around the vehicle 100' at the predefined distance away from the vehicle 100'.

Figure 3B:
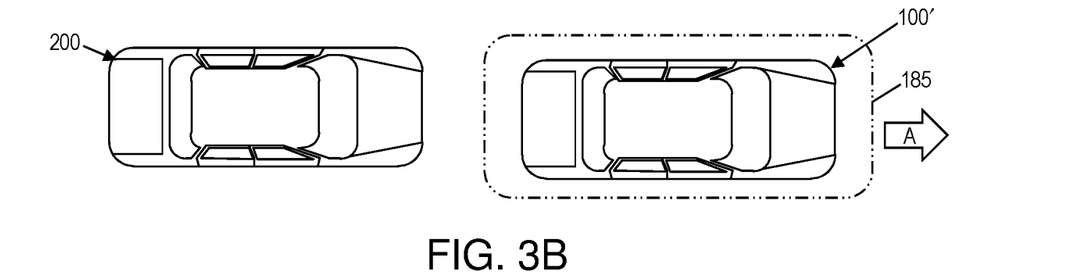
FIGS. 3B-3E depict an exemplary use case that illustrates functionality of the system of FIG. 3A.

FIGS. 3B-3E depict an exemplary use case that illustrates functionality of the system of FIG. 3A. FIG. 3B shows the vehicle 100' and another vehicle 200 moving in the direction of arrow A at time t1. The proximity sensors 180 are configured to detect the presence of an object within a predefined distance 185 of the vehicle 100'. As illustrated in FIG. 3B, the vehicle 200 is not within the predefined distance 185, with the results that the digital cameras are not capturing digital images.

Figure 3C:
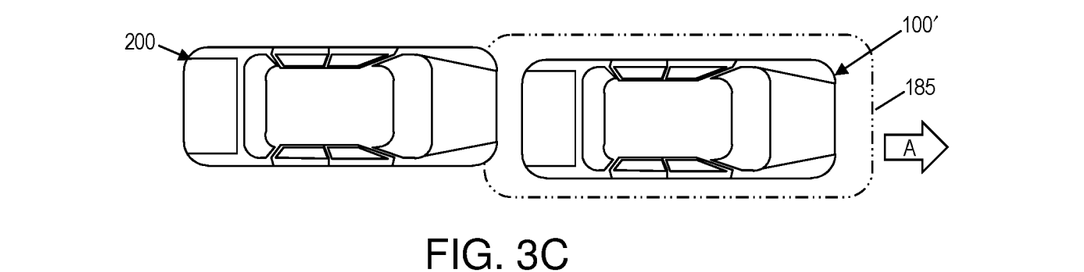

FIG. 3C shows the vehicle 100' and the other vehicle 200 moving in the direction of arrow A at time t2 after time t1. As shown in FIG. 3C, the vehicle 200 has moved to within the predefined distance 185 of the vehicle 100'. In response to this, the onboard computer 125 controls the digital cameras 110 to start capturing digital images of the area 112 around the vehicle 100'.

Figure 3D:
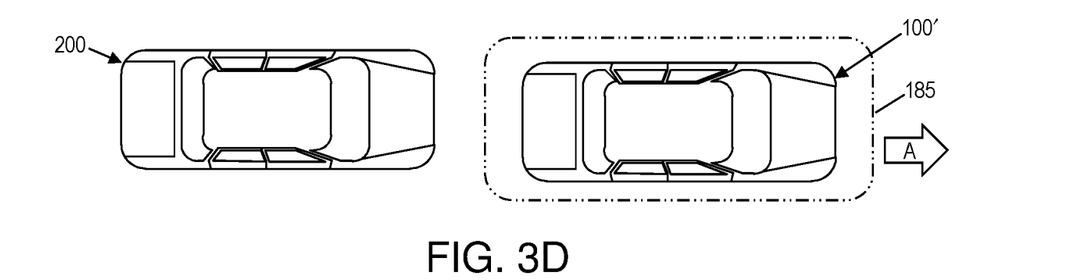

FIG. 3D depicts a first possible situation at time t3 after time t2 in which the other vehicle 200 has moved out of the predefined distance 185 around the vehicle 100' without coming into contact with the vehicle 100'. In this situation, the onboard computer 125 deems that a collision did not occur based on the impact sensors 105 not detecting an impact while the vehicle 200 was within the predefined distance 185 around the vehicle 100'. Based on this, the onboard computer 125 turns off the digital cameras 110 and deletes the digital images that were captured by the digital cameras 110 while the other vehicle 200 was within the predefined distance 185 around the vehicle 100'.

Figure 3E:
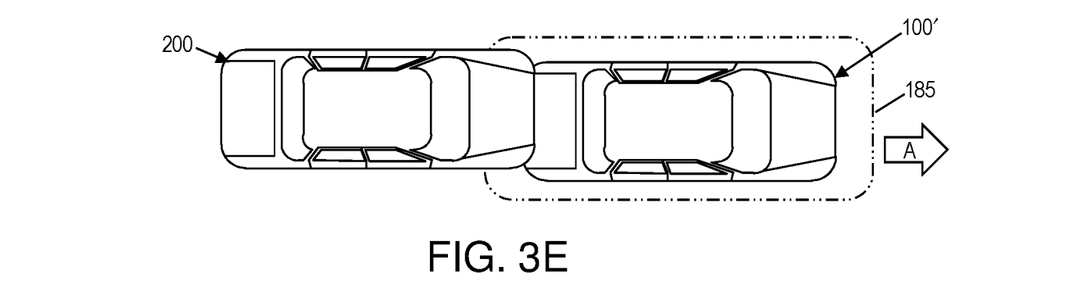

FIG. 3E depicts a second possible situation at time t3 after time t2 in which the other vehicle 200 has stayed within the predefined distance 185 around the vehicle 100' and has come into contact with the vehicle 100'. In this situation, the onboard computer 125 deems that a collision occurred based on the impact sensors 105 detecting an impact. Based on this, the onboard computer 125 controls the digital cameras 110 to continue capturing digital images for a predefined amount of time, and then transmits the data (e.g., the digital images, vehicle identifier, date, time, and location) to the remote server 115 for distribution to the designated recipients.

According to aspects of the invention, the onboard computer 125 may dynamically adjust the predefined distance 185 based on a detected driving condition of the vehicle 100'. In embodiments, the onboard computer 125 may be configured to determine a driving condition of the vehicle 100' and to dynamically adjust the sensitivity of the proximity sensors 180 to alter the magnitude of the predefined distance 185 based on the determined driving condition. For example, based on determining that the vehicle is in a first driving condition (e.g., stopped) the onboard computer 125 may adjust the sensitivity of the proximity sensors 180 such that the predefined distance 185 has a first value. Based on determining that the vehicle is in a second driving condition (e.g., less than 20 mph) the onboard computer 125 may adjust the sensitivity of the proximity sensors 180 such that the predefined distance 185 has a second value that is different than the first value. Based on determining that the vehicle is in a third driving condition (e.g., greater than 20 mph) the onboard computer 125 may adjust the sensitivity of the proximity sensors 180 such that the predefined distance 185 has a third value that is different than the first value and the second value. The onboard computer 125 may be configured to determine a driving condition of the vehicle 100' based on, for example, the speed and/or acceleration of the vehicle 100' which may be detected using conventional sensors.

Figure 4:
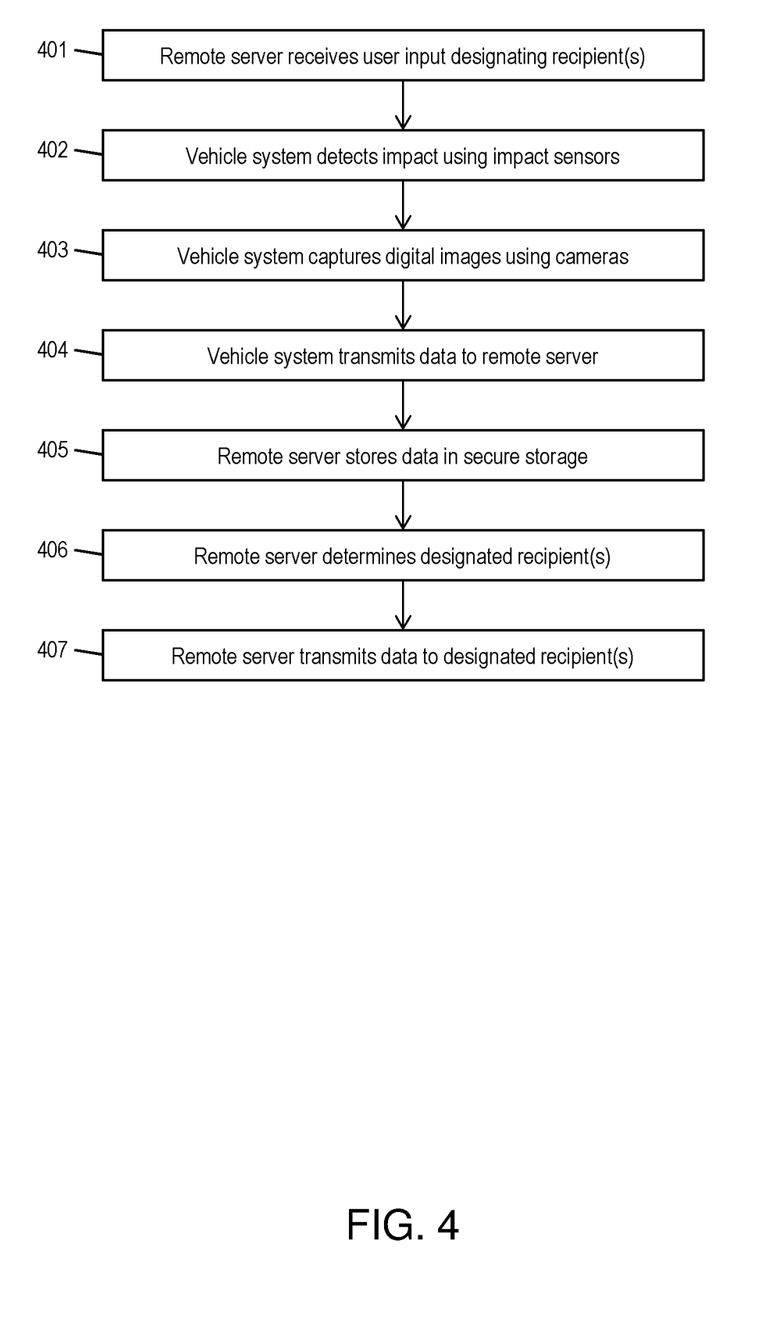
FIGS. 4 and 5 each show a flowchart of an exemplary method in accordance with aspects of the invention.

FIG. 4 shows a flowchart of a method in accordance with aspects of the invention. Steps of the method of FIG. 4 may be performed in the system illustrated in FIG. 2A and are described with reference to elements and steps described with respect to FIG. 2A.

At step 401, the remote server 115 receives user input defining one or more designated recipients of collision data. For example, as described with respect to FIG. 2A, a user may provide input via a user device 150 or an interface 155 connected to the onboard computer 125, and this input may be transmitted to and stored at the remote server 115. The user input may define one or more designated recipients of collision data associated with the vehicle 100, e.g., by telephone number, email address, MAC address, IP address, etc. The user input may also define the vehicle 100 that the designated recipients are associated with, e.g., via VIN, license plate, etc.

At step 402, the vehicle system determines that an object has impacted the vehicle 100. In embodiments, the onboard computer 125 detects the impact based on data from one or more impact sensors 105, e.g., as described with respect to FIG. 2A.

At step 403, the vehicle system captures digital images based on the detecting the impact at step 402. In embodiments, the onboard computer 125 controls the digital cameras 110 to capture digital images of an area 112 around the vehicle 100 for a predefined amount of time, e.g., as described with respect to FIG. 2A.

At step 404, the vehicle system transmits data to the remote server. In embodiments, the onboard computer 125 wirelessly transmits data generated by the collision (e.g., the digital images captured by the digital cameras 110 at step 403, an identifier of the vehicle 100, date and time of the detected impact, and location of the vehicle 100 during the detected impact) to the remote server 115, e.g., as described with respect to FIG. 2A.

At step 405, the remote server 115 receives the data from the onboard computer 125 (i.e., the data from step 404) and stores the data in secure storage. For example, as described with respect to FIG. 2A, the remote server 115 may store the data as part of a cloud service.

At step 406, the remote server 115 determines the designated recipients. In embodiments, the remote server 115 determines the designated recipients based on comparing a vehicle identifier included in the data (from step 404) to a vehicle identifier included in the user input (from step 401), e.g., as described with respect to FIG. 2A.

At step 407, the remote server 115 transmits data to the designated recipients determined at step 406. In embodiments, as described with respect to FIG. 2A, the remote server 115 transmits the data associated with the collision (e.g., the digital images captured by the digital cameras 110 at step 403, an identifier of the vehicle 100, date and time of the detected impact, and location of the vehicle 100 during the detected impact) to recipient devices 120 based on recipient information (e.g., telephone number, email address, etc.) included in the user input from step 401.

Figure 5:
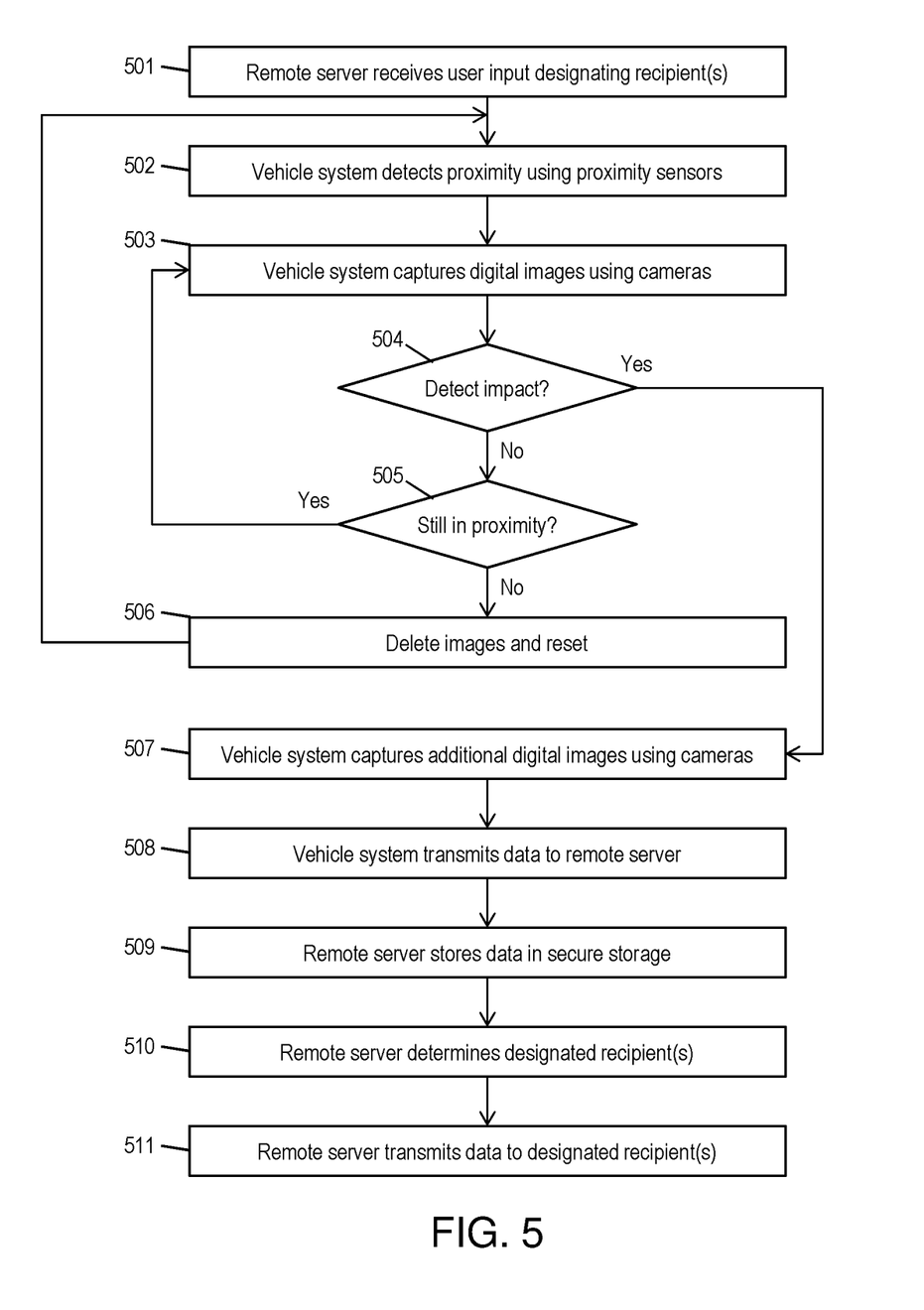

FIG. 5 shows a flowchart of a method in accordance with aspects of the invention. Steps of the method of FIG. 5 may be performed in the system illustrated in FIG. 3A and are described with reference to elements and steps described with respect to FIG. 3A.

At step 501, the remote server 115 receives user input defining one or more designated recipients of collision data. Step 501 may be performed in the same manner as step 401.

At step 502, the vehicle system determines that an object is within a proximity (e.g., within a predefined distance 185) of the vehicle 100'. In embodiments, the onboard computer 125 detects the proximity based on data from one or more proximity sensors 180, e.g., as described with respect to FIG. 3A.

At step 503, the vehicle system captures digital images based on the detecting the proximity at step 502. In embodiments, the onboard computer 125 controls the digital cameras 110 to capture digital images of an area 112 around the vehicle 100', e.g., as described with respect to FIG. 3A.

At step 504, the vehicle system determines whether an impact with the vehicle 100' has been detected. In embodiments, the onboard computer 125 detects an impact (or an absence of an impact) based on data from one or more impact sensors 105, e.g., as described with respect to FIG. 3A.

In the event that an impact is not detected at step 504, then at step 505 the vehicle system determines whether an object is still in proximity to the vehicle 100'. In embodiments, the onboard computer 125 continuously analyzes data from the one or more proximity sensors 180 to determine whether an object is still within the predefined distance 185 around the vehicle 100'. In the event that the system determines that an object is still in proximity to the vehicle 100' at step 505, then the process loops back to step 503 in which the vehicle system continues capturing digital images based on the detecting the proximity. This is analogous to the situation illustrated in FIG. 3C in which the vehicle 200 is within the predefined distance 185 but has not impacted the vehicle 100'. In the event that the system determines that an object is no longer in proximity to the vehicle 100' at step 505, then at step 506 the systems deletes the images (from step 503) and resets. This is analogous to the situation illustrated in FIG. 3D in which the vehicle 200 came within proximity of the vehicle 100' and then went out of proximity of the vehicle 100' without ever impacting the vehicle 100'.

In the event that an impact is detected at step 504, then at step 507 the vehicle system deems that a collision has occurred and captures additional images using the digital cameras 110. As described with respect to FIG. 3A, the digital cameras 110 may be controlled to capture digital images in this manner for a predefined time after the impact or for as long as the proximity sensors 180 detect that an object is within the predefined distance 185 of the vehicle 100'. This is analogous to the situation illustrated in FIG. 3E in which the vehicle 200 came within proximity of the vehicle 100' and then impacted the vehicle 100'.

At step 508, the vehicle system transmits data to the remote server. In embodiments, the onboard computer 125 wirelessly transmits data generated by the collision (e.g., the digital images captured by the digital cameras 110 at steps 503 and 507, an identifier of the vehicle 100, date and time of the detected impact, and location of the vehicle 100 during the detected impact) to the remote server 115, e.g., as described herein.

At step 509, the remote server 115 receives the data from the onboard computer 125 (i.e., the data from step 508) and stores the data in secure storage. For example, as described herein, the remote server 115 may store the data as part of a cloud service.

At step 510, the remote server 115 determines the designated recipients. In embodiments, the remote server 115 determines the designated recipients based on comparing a vehicle identifier included in the data (from step 508) to a vehicle identifier included in the user input (from step 501), e.g., as described herein.

At step 511, the remote server 115 transmits data to the designated recipients determined at step 510. In embodiments, as described herein, the remote server 115 transmits the data associated with the collision (e.g., the digital images captured by the digital cameras 110 at steps 503 and 507, an identifier of the vehicle 100, date and time of the detected impact, and location of the vehicle 100 during the detected impact) to recipient devices 120 based on recipient information (e.g., telephone number, email address, etc.) included in the user input from step 501.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for capturing digital images during vehicle collisions, comprising:
    detecting, by a computer device, an impact with a vehicle;
    controlling, by the computer device and based on the detecting, at least one digital camera to capture images of an area around the vehicle; and
    transmitting, by the computer device, the images to a server that is remotely located relative to the vehicle,
    detecting, by the computer device and prior to the detecting the impact, an object within a predefined distance around the vehicle;
    detecting, by the computer device, an impact with a tire of the vehicle by receiving a signal from a tire pressure sensor of the vehicle;
    controlling, by the computer device and based on the detecting the object, the at least one digital camera to capture pre-impact images of the area around the vehicle; and
    dynamically adjusting, by the computer device, the predefined distance around the vehicle based on a determined driving condition of the vehicle,
    wherein the area around the vehicle is a 360 degree view around the vehicle,
    the 360 degree view includes a front area at a front of the vehicle, a rear area at a rear of the vehicle, a left area at a left side of the vehicle, and a right area at a right side of the vehicle, and
    the pre-impact images captured include all of the 360 degree view.

2. The method of claim 1, wherein the at least one camera comprises:
    at least one camera with a field of view at a front of the vehicle;
    at least one camera with a field of view at a rear of the vehicle;
    at least one camera with a field of view at a left side of the vehicle; and
    at least one camera with a field of view at a right side of the vehicle.

3. The method of claim 1, wherein the transmitting is via wireless communication.

4. The method of claim 1, wherein the transmitting comprises transmitting: the captured images; the captured pre-impact images; an identifier of the vehicle; date and time of the detected impact; and a location of the vehicle during the detected impact.

5. The method of claim 4, wherein the server is configured to securely store the captured images and the captured pre-impact images.

6. The method of claim 4, wherein the server is configured to transmit the captured images and the captured pre-impact images to at least one designated recipient.

7. The method of claim 6, wherein the server is configured to determine the at least one designated recipient based on the identifier of the vehicle and previously received user input.

8. The method of claim 6, wherein the at least one designated recipient comprises an owner of the vehicle or an insurance provider.

9. The method of claim 6, wherein the server is configured to transmit the captured images and the captured pre-impact images to the at least one designated recipient via email.

10. The method of claim 1, wherein:
    the pre-impact images are captured prior to the detecting the impact;
    the images are captured after the detecting the impact; and
    the transmitting comprises transmitting the images and the pre-impact images to the server.

11. The method of claim 1, wherein:
    the computer device comprises networked device;
    the server comprises network broker; and
    the transmitting comprises the networked device publishing data to the network broker.

12. The method of claim 1, wherein the controlling comprises controlling the at least one digital camera to capture the images for a predefined amount of time after the detecting the impact.

13. A collision recording system, comprising:
    a computer device onboard a vehicle;
    at least one proximity sensor on the vehicle;
    at least one tire pressure sensor on the vehicle; and
    at least one camera on the vehicle;
    wherein the computer device is configured to:
        determine that an object is within a proximity of the vehicle based on data from the at least one proximity sensor;

in response to the determining that the object is within the proximity of the vehicle, control the at least one camera to capture images of an area around the vehicle; and after the determining that the object is within the proximity of the vehicle, perform one of: (i) detect an impact with the vehicle based on data from the at least one tire pressure sensor, and continue controlling the at least one camera to capture additional images of the area around the vehicle after the detected impact; and (ii) determine that an object is no longer within the proximity of the vehicle without detecting an impact, and delete the captured images, wherein the area around the vehicle is a 360 degree view around the vehicle, the 360 degree view includes a front area at a front of the vehicle, a rear area at a rear of the vehicle, a left area at a left side of the vehicle, and a right area at a right side of the vehicle, and the images captured include all of the 360 degree view.

14. The system of claim 13, wherein the at least one camera comprises:
at least one camera with a field of view at a front of the vehicle;
at least one camera with a field of view at a rear of the vehicle;
at least one camera with a field of view at a left side of the vehicle; and
at least one camera with a field of view at a right side of the vehicle.

15. The system of claim 13, wherein the computer device is configured to wirelessly transmit data to a server that is remotely located relative to the vehicle, the data comprising: the images and the additional images; an identifier of the vehicle; date and time of the detected impact; and a location of the vehicle during the detected impact.

16. The system of claim 15, wherein the server is configured to securely store the data and transmit the data to at least one designated recipient.

17. A computer program product for capturing digital images during vehicle collisions, the computer program product comprising a computer readable storage medium having program instructions embodied therewith, the program instructions executable by a computer device to cause the computer device to:

determine that an object is within a proximity of a vehicle based on data from at least one proximity sensor on the vehicle;

in response to the detecting the object is within a proximity of the vehicle, control at least one camera on the vehicle to capture images of an area around the vehicle; and after the determining that the object is within a proximity of the vehicle, perform one of:
(i) detect an impact with the vehicle based on data from at least one tire pressure sensor on the vehicle, continue controlling the at least one camera to capture additional images of the area around the vehicle for a predefined amount of time after the detected impact, and transmit the images and the additional images to a server that is remote from the vehicle and that is configured to transmit the images and the additional images to at least one designated recipient; and
(ii) delete the images in response to determining that an object is no longer within the proximity of the vehicle without detecting an impact, wherein the area around the vehicle is a 360 degree view around the vehicle, the 360 degree view includes a front area at a front of the vehicle, a rear area at a rear of the vehicle, a left area at a left side of the vehicle, and a right area at a right side of the vehicle, and the images captured include all of the 360 degree view.

18. The system of claim 13, wherein a distance within which the object is determined to be within the proximity of the vehicle is dynamically adjusted to a first distance when the vehicle is stopped, and dynamically adjusted to a second distance when the vehicle is moving, the second distance being different than the first distance.

19. The method of claim 1, further comprising dynamically adjusting the predefined distance around the vehicle to a first distance when the vehicle is stopped, and dynamically adjusting the predefined distance around the vehicle to a second distance when the vehicle is moving, the second distance being different than the first distance, wherein the dynamically adjusting the predefined distance comprises adjusting a sensitivity of a proximity sensor on the vehicle.

* * * * *